Patented May 30, 1939

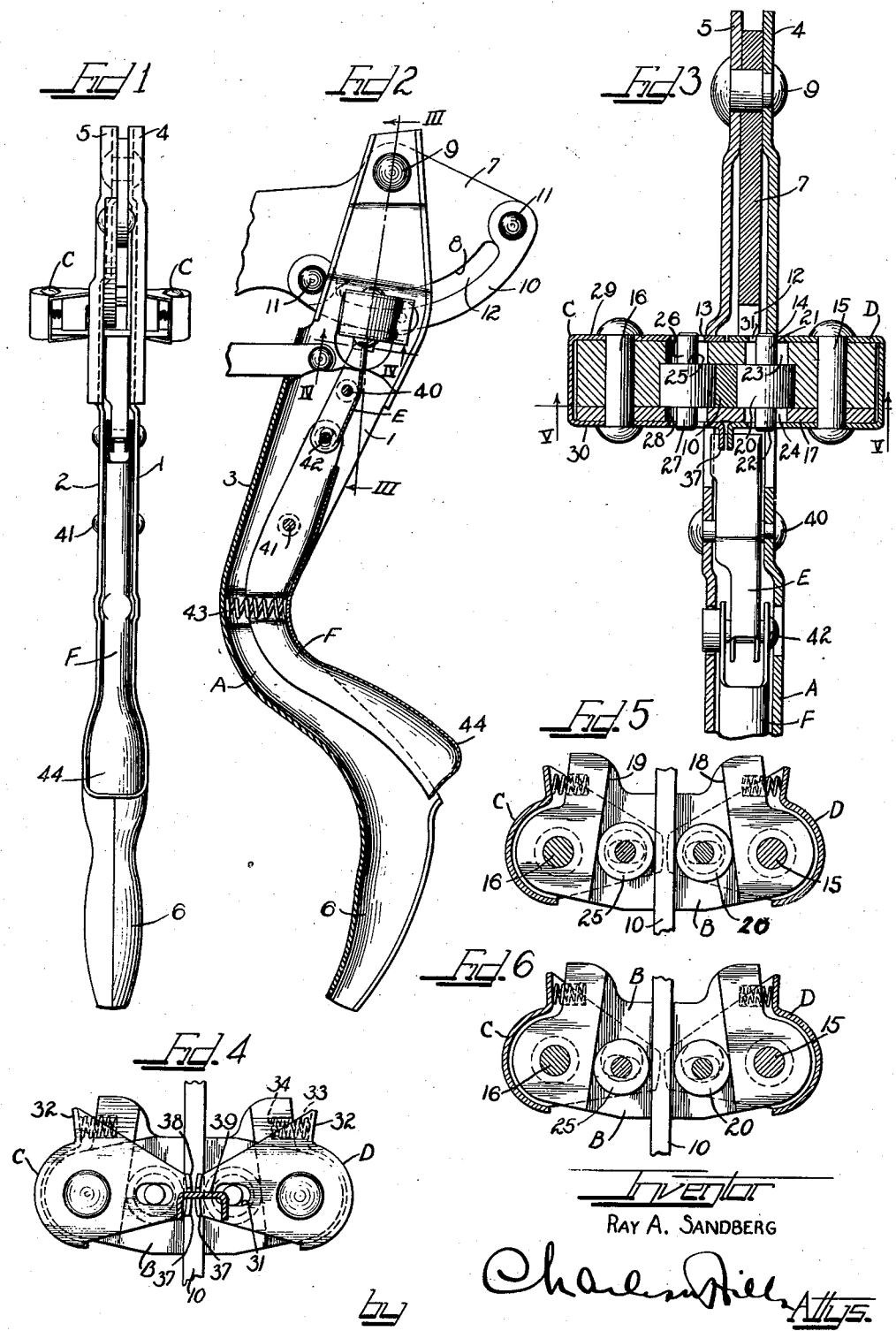

2,160,679

UNITED STATES PATENT OFFICE 2,160,679

FRICTION BRAKE LEVER

Ray A. Sandberg, Waukegan, Ill., assignor, by mesne assignments, to Houdaille-Hershey Corporation, Detroit, Mich., a corporation of Michigan Application May 5, 1938, Serial No. 206,105

5 Claims. (Cl. 74—531)

The present invention relates to friction brake lever and more particularly to one useful as an emergency brake lever for automotive vehicles in which rollers are arranged to wedge against opposite faces of a mounting plate for the lever to hold the lever in adjusted position.

An object of the present invention is to provide an efficient friction brake lever for automotive vehicles with means for effectively holding the lever in adjusted position by wedging action between the lever and its mounting plate.

Another object of the present invention is to improve friction brake levers for automotive vehicles.

A further object of the present invention is to provide an emergency brake lever construction for automotive vehicles, of the friction type, wherein wedging members are jammed between abutments carried by the lever and engaging opposite faces of a flat mounting plate to hold the lever in adjusted position, the parts so arranged that as the lever tends to move under brake pull, the frictional engagement will be increased.

A further object of the present invention is to provide a friction type brake lever construction in which a lever member is provided with spaced legs at its fulcrum end to straddle a flat mounting plate and which lever carries two rollers, one on each side of the plate, to work with wedging action against opposite faces of the plate for frictionally holding the lever in adjusted position.

The above, other and further objects of the present invention will be apparent from the following description and accompanying drawing.

The accompanying drawing illustrates an embodiment of the present invention and the views thereof are as follows:

Figure 1 is an edge elevational view of a brake lever constructed in accordance with the principles of the present invention;

Figure 2 is a view, partially in side elevation and partially in section, showing details of construction of the illustrated form of lever, with the lever in "off" position and the parts in the positions assumed when the rollers are in frictional holding engagement with the bracket;

Figure 3 is an enlarged fragmental vertical sectional view taken substantially in the plane indicated by line III—III of Figure 2;

Figure 4 is a bottom plan view of the bar, taken substantially in the plane indicated by line IV—IV of Figure 2, showing the rollers in frictional holding engagement with the mounting plate;

Figure 5 is a view similar to Figure 4, showing a horizontal section taken substantially in the plane indicated by line V—V of Figure 3, with the rollers in frictional holding engagement with the mounting plate;

Figure 6 is a view similar to Figure 5, with the rollers shifted out of holding engagement.

The drawing will now be explained.

The lever chosen to exemplify the present invention is formed as a stamping, of substantially U-shaped configuration in cross section, for a major portion of its length, providing side walls 1 and 2, a connecting web 3, spaced legs 4 and 5, and a closed hollow grip portion 6.

A fragmental portion of a mounting plate 7 is illustrated, which plate is provided with an an arcuate margin 8 struck on a radius the center of which is the axis of the pivotal connection 9 of the lever to the mounting plate 7. As illustrated, an arcuate piece 10 is riveted at its ends 11 to the plate, and is spaced from the arcuate margin 8 to therewith define an arcuate recess 12. It is to be understood that the piece 10 might be made as an integral part of the plate 7, if desired, by any suitable stamping operation.

As illustrated, the piece 10 is offset laterally with respect to the plane of the mounting plate 7. If desired, this piece might be included in the plane of the plate and the parts of the lever arranged accordingly.

A bar B is arranged to pass through registering apertures 13 and 14, respectively, in the legs 5 and 4 and to pass through the arcuate slot or recess 12 formed in the mounting plate 7 as described.

The ends of the bar are thickened to extend downwardly, which ends are apertured to receive pivots or the like, 15 and 16.

The lower end of the bar has applied to it a closure member 17 held in place by the pivots 15 and 16 through the instrumentalities of cage members C and D which are oscillatably arranged on the ends of the bar to swing about the pivots 15 and 16.

The end portions of the bar B are formed with walls which incline with respect to the adjacent faces of the piece 10. The walls 18 and 19, respectively, of the right and left hand ends of the bar B, as disclosed in the drawing, are inclined convergently towards the piece 10, in the direction of brake pull.

In Figures 4, 5 and 6, the direction of brake pull is upwardly, while in Figure 2 the pull is to the left.

Between the wall 18 of the right hand end of the bar B, and the adjacent face of the piece 10 a cylindrical roller 20 is arranged, having reduced end or axle portions 21 and 22, 21 being the upper and 22 the lower axle portion. The bar B is slotted at 23 to receive the upper axle portion 21, and the closure member 17 is slotted at 24 to receive the lower axle portion 22. The diameter of the roller 20 is such that when the rollers are in frictional holding engagement with the piece 10 of the mounting, the axes of the rollers lie substantially in a vertical plane including the axes of the pivots 15 and 16.

A similar roller 25 works between the inclined wall 19 of the left hand end of the bar and the adjacent face of the piece 10. This roller has an upper axle portion 26 shiftable in a slot 26 formed in the bar, and a lower axle portion 27 shiftable in a slot 28 formed in the closure member 17.

As illustrated, the extremities of the ends of the bar are circular so that the cages C and D may oscillate about the pivots 15 and 16 in a manner to be later described.

The cages C and D are formed of stamped metal arranged as illustrated, with upper and lower walls 29 and 30 respectively to engage against the upper faces of the bar and the lower surfaces of the closure member 17, respectively, when the parts are assembled, and as fully illustrated. The walls 29 and 30 taper towards the piece 10 and are slotted as at 31 to receive the axle portions of the rollers for shifting the rollers towards and away from the piece 10 of the mounting plate. The cages C and D have outturned abutments 32, as clearly observed in Figure 4, against the inner faces of which abutments springs 33 act. The other ends of the springs are entered in bores 34 formed in the ends of the bar as illustrated. The springs 33 tend normally to rock the right hand cage in clockwise direction, as viewed in Figures 4, 5 and 6, and the left hand cage in counterclockwise direction, as viewed in these figures. Such tendency to rock, of the cages, normally maintains the rollers in contact with the piece 10 so that any tendency to move the lever, by brake pull, will tend to roll the rollers on the surfaces of the piece 10, and towards the convergent portions of the spaces formed between the adjacent faces of the piece 10 and the inclined walls 18 and 19 at the end of the bar.

The lower walls of the cages are formed with downturned flange portions 37 which are notched at 38 to receive an end 39 of a release member E shown as a stamping formed to substantially U-shaped configuration in cross section, and is pivoted at 40 to the walls of the lever A, adjacent the fulcrum end.

An actuating member F, shown as a stamping of generally U-shape configuration in cross section, is arranged to rock between the walls of the lever A, being pivoted to the walls at 41. The adjacent end of the release member E in the actuating member F, are operatively connected by pin and slot connection, designated generally at 42.

Spring means may be utilized to maintain the actuating member at the normal position, which is the position shown in Figure 2. The spring means illustrated enclose the coiled spring 43 arranged between the lapped walls of the brake member A and the actuating member F, with the ends of the spring bearing against the opposed webs of these members.

In the normal position of the parts, as shown in Figure 2, the spring 43 maintains the actuating member F in the position there shown, which in turn through the instrumentality of the release member E normally allows the springs 33 to function to maintain the rollers in contact with the opposite faces of the piece 10 of the mounting bracket, so that any tendency of the lever to move in retrograde direction due to brake pull will effect frictional holding engagement between the rollers and the piece 10 to thus hold the lever in adjusted position.

The lower end of the release member F is provided with a part 44 in position to be depressed by the thumb of the operator's hand to release the lever from holding engagement.

The operation of the illustrated form of brake lever is as follows:

To set the brakes, the operator grasps the grip portion 6 of the lever A and swings it in counterclockwise direction as viewed in Figure 2. When the lever has been swung a sufficient distance, the operator releases his hand from the lever. Immediately the rollers 20 and 25 become wedged between the inclined walls 18 and 19 of the bar and the adjacent faces of the piece 10 of the mounting plate hold the lever in adjusted position. The strain imposed on the lever by the pull of the brake mechanism is sufficient to maintain the rollers in wedging engagement against accidental displacement. As described, the centers of the rollers are substantially in alignment with the centers of the pivots 15 and 16 of the cages, so that maximum frictional holding engagement is achieved.

To release the lever, the operator depresses the thumb portion 44 of the actuating member F which movement shifts the cages from the position of Figure 6, thereby moving the rollers away from the piece 10 and releasing the holding engagement of the lever with its mounting plate whereupon the lever may be moved in clockwise direction, as viewed in Figure 2, to its "off" position.

A clevis 45 is illustrated as pivoted at 40. A pull rod or cable 46 is attached to the clevis at one end and at its other end is secured to the brake mechanism of the vehicle.

The brake lever construction described, is rugged, is capable of efficiently holding the brakes in set position without accidental movement of the lever which might be occasioned by a strong brake pull.

The disposition of the rollers in substantial alignment with the axes of pivots 15 and 16 obviates any lever arm effect that might be present were the rollers arranged otherwise and in such alignment.

The invention has been described more or less precisely as to details, yet it is to be understood that the invention is not to be limited thereby, as changes may be made in the arrangement and proportion of parts, and equivalents may be substituted, without departing from the spirit and scope of the invention.

The invention is claimed as follows:

1. In an automotive emergency brake lever construction, a mounting plate, a lever having spaced legs astraddle said plate and thereto pivoted, said plate having an arcuate slot through it struck on a radius having its center in the pivot axis, said legs being apertured in register with said slot, a bar extending through said leg apertures and said slot and projecting outwardly of the legs, the ends of said bar being fashioned to form vertical walls one on each side of said plate and in spaced relation to the adjacent plate surface, said walls being horizontally inclined toward said plate in the direction of brake pull, a roller between one end wall and its adjacent plate surface, another roller betwen the other end wall and its adjacent plate surface, said rollers having axles above and below the same and extending substantially vertically, the bar being slotted to receive the upper axles of said rollers, a closure member against the bottom of said end and having slots for the lower axles of the rollers, U-shaped cages oscillatable on the bar ends and having apertured arms receiving the axles of said rollers, spring means acting against said cages to swing them in directions to maintain the rollers in contact with the plate and in wedging position between the plate and the bar end walls, and manually operable means for swinging said cages in opposite directions to free the rollers from frictional engagement with said plate.

2. In a device of the class described, in combination, a mounting plate having an arcuate slot in it, a lever having spaced legs astraddle said plate and thereto pivoted, said legs being apertured in register with said plate slot, a bar extending through said plate apertures and said slot and having downwardly projecting ends with flat vertical walls defining surfaces of the ends, said walls being longitudinally inclined towards the plate in direction of brake pull, a closure member against the bottoms of said ends, rollers between said bar and said closure with one roller on one side of said plate and another roller on the other side of said plate, means oscillatable on said bar ends for shifting said rollers into and out of wedging position between said plate and said end walls, spring means for urging said last mentioned means in directions to shift the rollers into frictional engagement with said walls and plate, and manually operable means for moving said shifting means in the opposite direction.

3. In a device of the class described, in combination, a mounting plate having an arcuate slot in it, a lever having spaced legs astraddle said plate and thereto pivoted, a bar extending through said legs and plate slot and having end portions provided with vertical walls disposed in opposition to the side surfaces of said plate and spaced from the adjacent surfaces of the plate, said bar being constructed to provide recesses in its bottom, closure means for said recesses attached to the bottoms of said bar end portions, U-shaped cages pivoted to the bar ends to oscillate and having apertures overlying and underlying said recesses, rollers disposed in the bar recesses and having axles entered in the apertures of said cages to thereby support said rollers between said bar end walls and said plate, and means acting against said cages for urging them in directions to maintain the rollers in contact with said plate surfaces for wedging engagement with the plate and bar walls when the lever tends to movement occasioned by brake pull.

4. A dash type friction brake lever construction including a mounting plate having flat faces and an arcuate slot in it, a brake lever having spaced legs astraddle said plate and thereto pivoted, a bar extending through said legs and plate slot arranged with its ends projecting beyond the legs, said bar having an undercut portion between its ends to provide recesses between its ends and with the inner walls of said ends inclined with respect to the adjacent plate surfaces, a roller between said plate and one bar end wall, another roller between said plate and the other bar end wall, a closure plate for said recesses secured to said bar ends and engaging the lower ends of said rollers to retain them in place within said recesses, cages oscillatable on the bar ends with upper parts of the cages overlying the upper surfaces of the bar and lower parts of the cages underlying the closure plate, said cage portions being slotted to receive the axles of said rollers, springs acting against said cages to urge them in directions to maintain said rollers in surface contact with said plate surfaces and the bar end walls, and manually operable means for oscillating said cages in opposite directions to release the rollers from frictional engagement with the plate.

5. In a dash type brake lever of the class described, in combination, a mounting plate, a lever having spaced legs astraddle said plate and thereto pivoted, said plate being slotted and said legs being apertured, a bar extending through said apertures and slot and having its ends formed with depending vertical walls having faces longitudinally inclined with respect to the adjacent faces of the plate convergently in the direction of brake pull, cages oscillatably mounted on the ends of said bar astraddle said bar ends and loosely supporting each a roller between its end wall and the adjacent face of the plate for wedging engagement therebetween, springs acting against said cages to normally maintain them in such position that the rollers frictionally contact the plate surfaces in a manner to be rolled into frictional holding engagement under brake pull, and a release member operably associated with said cages to swing them in the opposite directions to free the rollers from holding engagement, the construction being such that the axes of said rollers when in wedged holding position lie in a plane including the axes of oscillation of said cages.

RAY A. SANDBERG.